US008171458B2

(12) United States Patent
Cheng et al.

(10) Patent No.: US 8,171,458 B2
(45) Date of Patent: May 1, 2012

(54) METHOD FOR SOURCE-RELATED RISK DETECTION AND ALERT GENERATION

(75) Inventors: Ping Cheng, Beijing (CN); Ya Bin Dang, Beijing (CN); Lin Luo, Beijing (CN); Peter K. Malkin, Ardsley, NY (US); Vadakkedathu T. Rajan, Briarcliff Manor, NY (US); Yuan Yuan, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 873 days.

(21) Appl. No.: 12/249,511

(22) Filed: Oct. 10, 2008

(65) Prior Publication Data

US 2010/0095277 A1 Apr. 15, 2010

(51) Int. Cl.
G06F 9/44 (2006.01)
(52) U.S. Cl. ...................................................... 717/126
(58) Field of Classification Search .................. 717/121, 717/124, 126, 127
See application file for complete search history.

(56) References Cited

U.S. PATENT DOCUMENTS

| | | | | |
|---|---|---|---|---|
| 6,748,555 | B1 * | 6/2004 | Teegan et al. | 714/38.12 |
| 7,493,596 | B2 * | 2/2009 | Atkin et al. | 717/124 |
| 7,519,562 | B1 * | 4/2009 | Vander Mey et al. | 705/500 |
| 7,523,138 | B2 * | 4/2009 | Gruhl et al. | 1/1 |
| 7,552,429 | B2 * | 6/2009 | Dettinger et al. | 717/162 |
| 7,568,109 | B2 * | 7/2009 | Powell et al. | 713/187 |
| 7,702,517 | B2 * | 4/2010 | Parapadakis | 705/1.1 |
| 2006/0059061 | A1 * | 3/2006 | Oey | 705/35 |
| 2007/0239495 | A1 * | 10/2007 | Osborn et al. | 705/7 |
| 2008/0021922 | A1 | 1/2008 | Hailpern et al. | |
| 2008/0320455 | A1 * | 12/2008 | Spurlin | 717/143 |

OTHER PUBLICATIONS

Detection of Plagiarism in Programming Assignments, Rosales et al., IEEE Transactions on Education, vol. 51, No. 2, May 2008.*
On Finding Duplication and Near-Duplication in Large Software Systems, Baker, 1995 IEEE.*
Plagiarism Detection in Software Designs, Belkhouche et al., ACM Southeast Conference '04, Apr. 23, 2004.*
A Code Provenance Management Tool for IP—Aware Software Development, Dang et al., ICSE'08, May 10-18, 2008.*
Ariadne: An Eclipse-based system for tracking the originality of source code, Luo et al., IBM Systems Journal, vol. 46, No. 2, 2007.*
"Software Compliance Management Solution", Blackduck, protexIP, version 4.0.
Basit et al., "Detecting Higher-level Similarity Patterns in Programs", ESEC-FSE'05.
Ohno et al., "Measuring Source Code Similarity Using Reference Vectors", International Journal of Innovative Computing, Information and Control, vol. 3, No. 3, Jun. 2007.

(Continued)

*Primary Examiner* — Wei Zhen
*Assistant Examiner* — Daxin Wu
(74) *Attorney, Agent, or Firm* — Scully, Scott, Murphy & Presser, P.C.; Daniel P. Morris, Esq.

(57) ABSTRACT

A method and system for detecting a source-related risk and generating an alert concerning the source-related risk are disclosed. Criteria of the source-related risk are defined. Thresholds associated with the source-related risk are defined. Every operation on an object is detected. If an operation on an object satisfies a criterion among the criteria or if the operation causes to exceed a threshold among the thresholds, an alert is generated for the operation.

21 Claims, 7 Drawing Sheets

OTHER PUBLICATIONS

Wahli, "Rational Application Developer V7 Programming Guide", Redbooks.

Wahli, "Software Configuration Management a Clear Case for IBM Rational ClearCase and ClearQuest UCM", Redbooks.

* cited by examiner

METHOD FOR SOURCE-RELATED RISK DETECTION AND ALERT GENERATION

BACKGROUND OF THE INVENTION

1. Fields of the Invention

The present invention generally relates to detecting a source-related risk. More particularly, the present invention relates to detecting a source-related risk during a development of an object.

2. Description of the Prior Art

With a trend of sharing and reusing, objects are composed of pre-existing materials or sub-objects created by a another person (e.g., a co-worker, a programmer working in a different company, etc.). This trend (i.e., sharing and reusing pre-existing materials) applies in software development. In a new software development, developers often leverage pre-existing materials (i.e., any material that has existed before a current development), such as open source code and a third party picture, with benefit of accelerating development progress, saving creation effort, or achieving good quality. However, leveraging pre-existing materials, especially pre-existing code, to the software development may also introduce source-related risks (i.e., a copyright issue, a licensing issue, a code pedigree (i.e., code coming from many different sources) issue).

An improper operation on source information of code increases a risk of code contamination, ownership and responsibilities, and increases a difficulty of sharing and reusing the code. Because of the improper operations (e.g., deleting developer or author's information) on code, a use of pre-existing code, especially code in a public domain, always carries a high risk of code contamination, both in a form of bugs inadvertently created and in a form of virus or worms intentionally produced. A programmer may intentionally delete author information or other source information (e.g., a copyright or licensing term) from open source code (i.e., source code is open to public; no royalty or other fee for selling, distributing, modifying and redistributing the source code; the source code can be used in anywhere) when adding the open source code to his or her current project. Because of the improper operations (e.g., deleting a copyright term), no matter by an accident or by an intention, during code development, developers may not be aware of a source-related risk or get any alert associated with the source-related risk, so that they have no confidence to share and reuse code.

SCM (Software Configuration Management) tools, such as CVS (Concurrent Versions System), IBM® ClearCase™ and Subversion™, can record developers and revisions (i.e., modifications on code) during check-in (i.e., putting code in a repository)/check-out (i.e., obtaining code from a repository) in a development of a software project. However, the SCM tools have a limitation of recording source information only at the moment of the check-in/check-out. That is, the SCM tools only check differences between a check-out version (i.e., code when being obtained) and a check-in version (i.e., code when being stored in a repository), so SCM tools do not check/trace all changes made between a check-out and a check-in. Furthermore, the SCM tools do not detect any source-related risk such as a copyright issue.

Black Duck™ Software is a provider of products and services for accelerating software development through a managed use of open source and third party code. Black Duck™ products and services can help mitigate risks and challenges associated with open source code, including hidden license obligation, security vulnerability, etc.

Although Black Duck™ Software provides tools such as managing open source and assuring license compliance, Black Duck™ Software only focuses on content of an object (e.g., code) and does not focus on a wider scope including operations to the content (e.g., modifying code, deleting code, inserting new code). Black Duck™ Software performs content comparison (i.e., comparing currently developed code and open source code) for a batch of files at a scheduled time. Thus, Black Duck™ Software works off-line.

Hailpern et al. (US Patent Application Publication No. 2008/0021922; hereinafter "Hailpern") provides a summary of source information of sub-objects in an object. This source information is tracked throughout a development of the object. However, Hailpern only tracks and records the source information but does not provide any determination (e.g., whether an operation on object causes a source-related risk) or does not generate an alert for a source-related risk.

There are also many traditional tools on defect detection, such as RAD (Rapid Application Development), CodeWizard and PC-Lint. These traditional tools focus on detecting function-level code defects (e.g., memory release) and do not detect any source-related risk. Therefore, the traditional tools usually collect information from source code by a static code analysis (i.e., an analysis of computer software that is performed without actually executing programs built from the software) or a dynamic program analysis (i.e., an analysis of computer software that is performed with executing programs built from that software on a real or virtual processor), compare a result of the static code analysis and a result of the dynamic software analysis, and generate a result of the comparison in a summary or highlight on source code. However, the traditional tools do not collect information from operations on code (e.g., inserting new code, modifying code, deleting code, etc.) and from source information of the code (e.g., a copyright term of the code, a licensing term of the code, author or developer of the code, etc.).

Moreover, in current software development projects, developers are often required at the end of software development to sign a "Certificate of Originality"(COO) stating which parts of the code of the software are their own creation, and which parts are from the Open Source or from other developers/authors. Due to a lack of an effective and reliable mechanism to maintain and track source information about code or due to a lack of an effective and reliable mechanism to remind a developer a source-related risk during development, this process (i.e., a process obtaining originality information of each code) usually takes 1-2 months to complete, which is both burdensome and costly. If the source-related risk can be detected and alerted to a developer during software development, the process will be more accelerated and easily since source-related risks can be greatly reduced whenever a source-related risk occur.

In the development of multimedia files (e.g., web pages, audios or videos), there is a critical need to track source information of various elements in a file, and then to determine whether there is a risk or not (e.g., whether the file contains any content whose access is either prohibited (e.g., illegally copied music) or restricted (e.g., using a trademarked logo after one's access rights have expired)). Without such a mechanism, people will be uncomfortable or unconfident to use the elements, which may violate copyrights, trademarks, licensing terms, etc.

Thus, it is highly desirable for a method and system directed to detect a source-related risk and to generate an alert whenever a source-related risk is detected.

SUMMARY OF THE INVENTION

The present invention describes a system and method to detect a source-related risk and to generate an alert for the source-related risk during a development of an object (e.g., hardware, software, service).

In one embodiment of the present invention, there is provided a method for detecting a source-related risk associated with an object and generating an alert concerning the source-related risk comprising:

obtaining at least one criterion of the source-related risk associated with the object;

obtaining at least one threshold associated with the source-related risk and associated with the object;

detecting an operation on the object;

determining whether the operation satisfies the at least one criterion of the source-related risk;

determining whether the operation causes exceeding the at least one threshold; and generating the alert if the operation satisfies the at least one criterion of the source related-risk, or if the operation causes exceeding the at least one threshold.

In one embodiment, there is provided a system for detecting a source-related risk associated with an object and generating an alert concerning the source-related risk comprising:

means for obtaining at least one criterion of the source-related risk associated with the object;

means for obtaining at least one threshold associated with the source-related risk and associated with the object;

means for detecting an operation on the object;

means for determining whether the operation satisfies the at least one criterion of the source-related risk;

means for determining whether the operation causes exceeding the at least one threshold; and means for generating the alert if the operation satisfies the at least one criterion of the source related-risk, or if the operation causes exceeding the at least one threshold.

The at least one criterion of the source-related risk is one or more of:

adding or pasting a sub-object in the object, the sub-object having unknown source information and not being compliant with a policy associated with the object;

modifying a sub-object in the object, the sub-object having source information which is not permitted in the object; and deleting source information of a sub-object in the object.

The at least one threshold comprises:

a threshold of percentage of added or pasted sub-objects whose source information is not known;

a threshold of incompliant source information of the object;

a threshold of similarity between the operation and previous operations; and a threshold of a removal of risky source information of the object

BRIEF DESCRIPTION OF THE DRAWINGS

The accompanying drawings are included to provide a further understanding of the present invention, and are incorporated in and constitute a part of this specification. The drawings illustrate embodiments of the invention and, together with the description, serve to explain the principles of the invention. In the drawings.

DETAILED DESCRIPTION

A source-related risk refers to any risk associated with source information. Source information refers to any information associated with source of an object, including content of the object, author/owner information of the object, a copyright or license term of the object, previous operations to the object, etc. Any improper operation on the source information may cause a source-related risk. For example, deletion of copyright information from open source code when used in software development is an improper operation and will result in a source-related risk (e.g., code pedigree). An object refers to hardware, software or service. The hardware includes, but is not limited to, a television, a radio, a computer, a watch, an air conditioner, a cellular phone, a pervasive digital device, etc. The software includes, but is not limited to, Microsoft® Windows®, FireFox, IBM® Informix®, etc. The service includes, but is not limited to, a child daycare service, gardening service, house cleaning service, etc.

Figure 1:
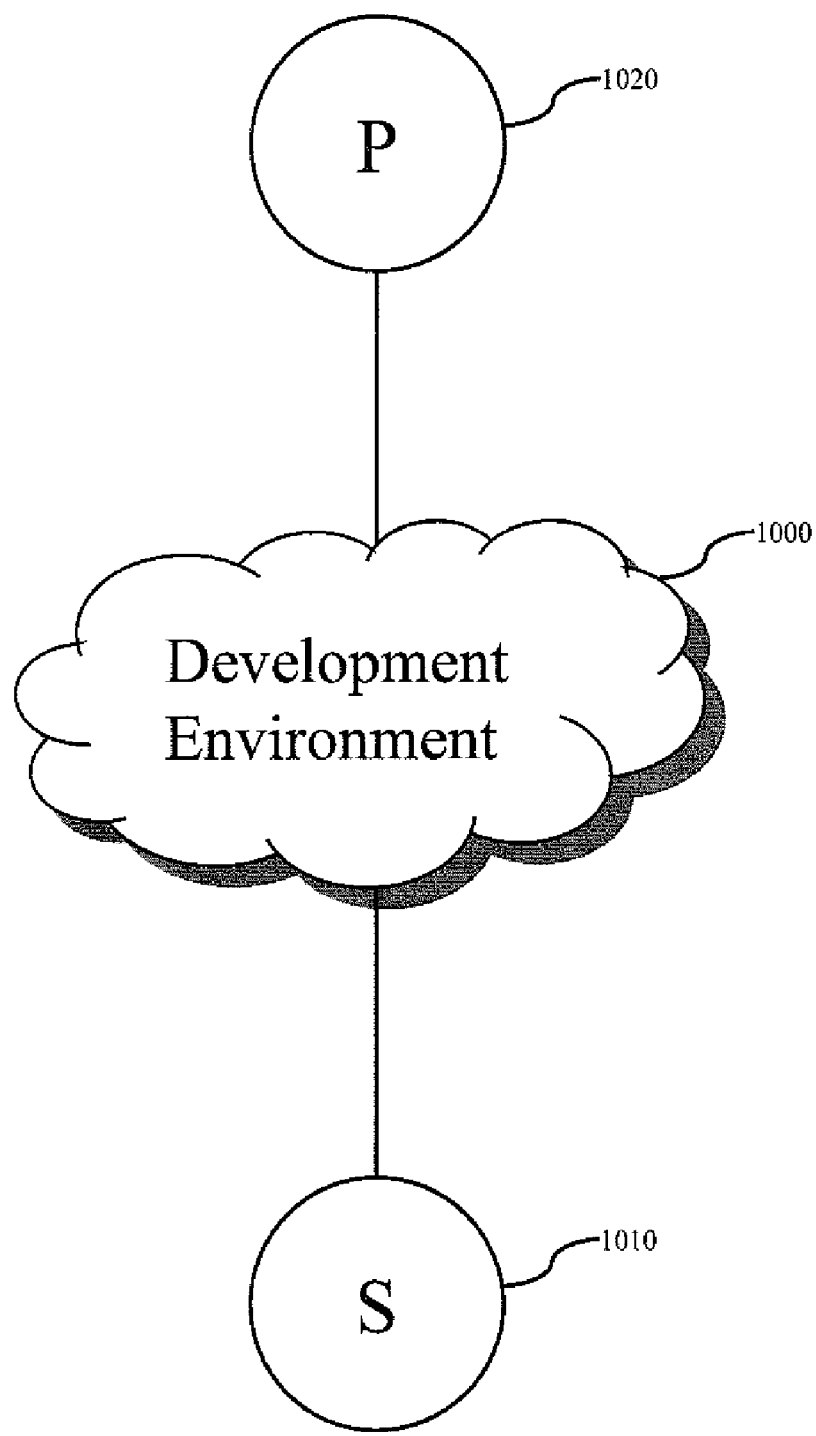
FIG. 1 illustrates an environment where one embodiment of the present invention is deployed.

FIG. 1 illustrates an environment where one embodiment of the present invention is deployed. A development environment 1000 can be presented as various forms according to various developed source code or artifact 1010. For example, when a programmer is developing a Java application, the development environment 1000 may include Eclipse (i.e., a software platform including extensible application framework, tools and a runtime library for software development and management). If a programmer is developing C++ application, the development environment 1000 may include Microsoft® Visual Studio®. The development environment 1000 may focus on software source code (i.e., any sequence of statements or declarations written in a computer programming language (e.g., C, C++, .Net, Java, etc.)) and package (i.e., a group of related classes of a program in object oriented programming (e.g., C++, .Net, Java, etc.)) and often use integrated development environment (IDE) (i.e., a software application that provides comprehensive facilities to programmer for software development; e.g., Eclipse, Microsoft® Visual Studio®). In one embodiment, during software development, all source code will be processed (e.g., edited, compiled, built and/or debugged) in the development environment 1000, and all potential source-related risks are detected and notified to a programmer/developer 1020 to reduce a cost introduced by the source-related risk. The development environment 1000 is also applicable for other situations, such as composing media (audio/video) files, news, etc.

Figure 2:
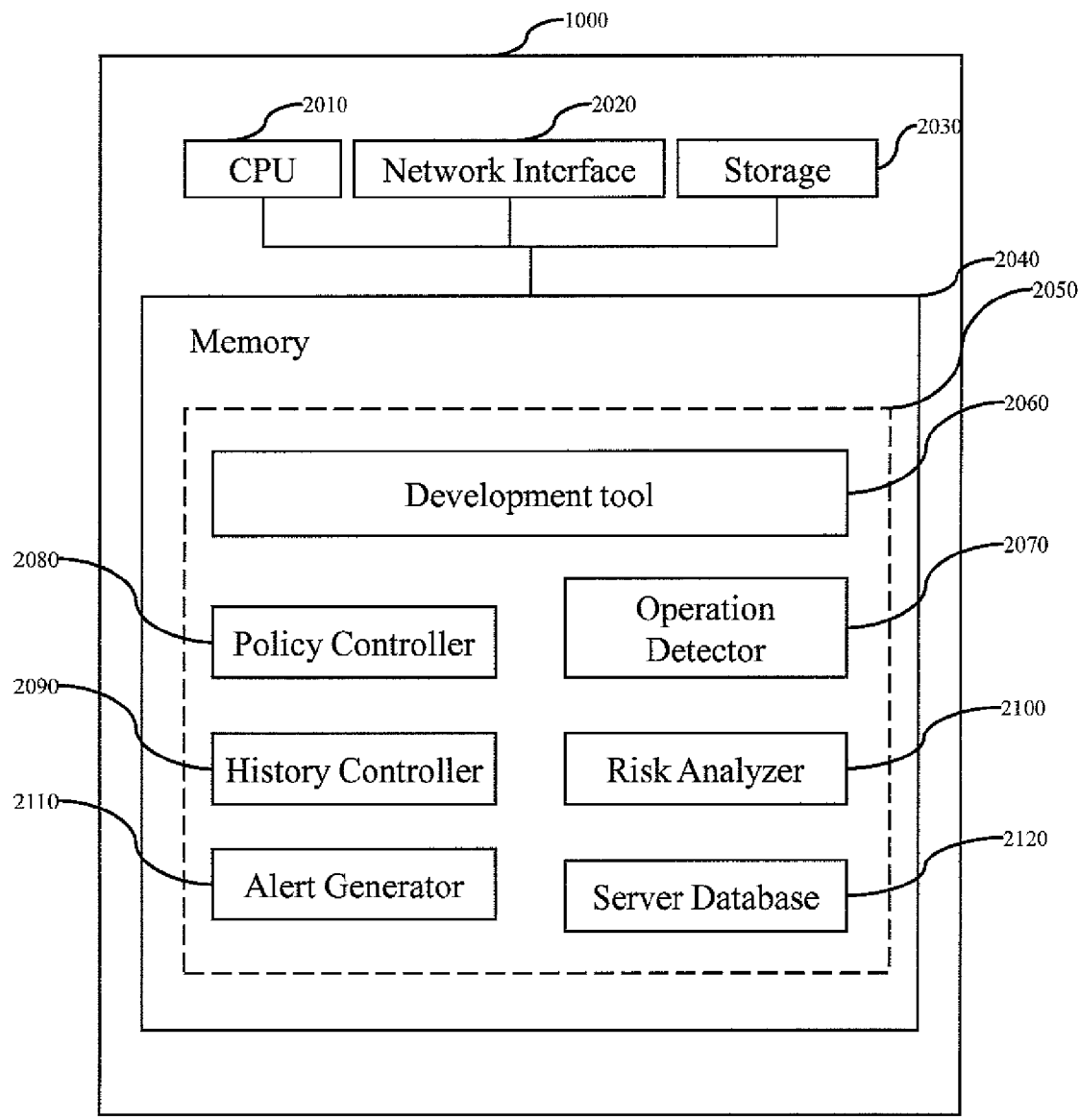
FIG. 2 illustrates a system diagram in one embodiment of the present invention.

FIG. 2 depicts a system diagram of the development environment 1000 shown in FIG. 1, which detects a source-related risk and generates an alert for the source-related risk. In one embodiment, the development environment 1000 may be a computing device such as a desktop, a laptop (e.g., IBM® ThinkPad®), a server, a PDA, a mainframe, a smartphone (e.g., Apple® iPhone®), etc. The computing device may include an operating system such as Microsoft® Windows®, UNIX (e.g., SUN Solaris®) or Linux (e.g., Ubuntu™). In one embodiment, programming language (e.g., C++, Java, .Net, etc.) used in the development environment 1000 may implement software component or module. In another embodiment, programming language (e.g., Verilog, System C, VHDL, etc.) used in the development environment 1000 may implement hardware component or module.

The development environment 1000 may include a CPU 2010 (e.g., Intel® Core® 2, IBM® Cell Processor, IBM® PowerPC®, etc.), a network interface 2020 (e.g., Ethernet Network Card, etc.), a storage device 2030 (e.g., a magnetic disk, optical disk, solid state drive, DASD (Direct Access Storage Device), etc.), and memory 2040 (RAM, ROM, Flash, etc.). In one embodiment, the development environment 1000 further includes development environment logic 2050.

The development environment logic 2050 includes a development tool 2060, an operation detector 2070, a policy controller 2080, a history controller 2090, a risk analyzer 2100, an alert generator 2110 and a server database 2120. The development tool 2060 includes, but is not limited to, IBM® Rational Application Developer, Eclipse or Microsoft® Visual Studio®. The server database 2120 includes, but is not limited to, Oracle®, IBM® DB2™, etc.

In one embodiment, the operation detector 2070, the policy controller 2080, the history controller 2090, the risk analyzer 2100 and the alert generator 2110 in the logic 2050 are implemented as software using a programming language (e.g., C, C++, Java, .NET, etc.). In one embodiment, the operation detector 2070, the policy controller 2080, the history controller 2090, the risk analyzer 2100 and the alert generator 2110 in the logic 2050 are recorded in a computer readable medium (e.g., CD (Compact Disc), DVD (Digital Versatile Disc), HDD (Hard Disk Drive), a memory 2040, etc.) as an instruction (e.g., a machine language or assembly language) that is executed by a processor (e.g., SUN® Sparc®, IBM® PowerPC®, AMD Opteron®).

In another embodiment, the operation detector 2070, the policy controller 2080, the history controller 2090, the risk analyzer 2100 and the alert generator 2110 in the logic 2050 are implemented as hardware on a reconfigurable hardware (e.g., FPGA (Field Programmable Gate Array) or CPLD (Complex Programmable Logic Device)) using a hardware description language (Verilog, VHDL, Handel-C, or System C). In a further embodiment, the operation detector 2070, the policy controller 2080, the history controller 2090, the risk analyzer 2100 and the alert generator 2110 in the logic 2050 are implemented on a semiconductor chip (e.g., ASIC (Application-Specific Integrated Circuit)) using a semi custom design methodology (i.e., designing a chip using standard cells and a hardware description language).

In a further embodiment, the operation detector 2070, the policy controller 2080, the history controller 2090, the risk analyzer 2100 and the alert generator 2110 in the logic 2050 are implemented as hardware through a computing device (e.g., the development environment 1000) by being executed in the computing device. The computing device comprises, but not limited to include, processor(s) 2010, memory(s) 2040, display device(s) (not shown), input/output device(s) (not shown) and network interface(s) 2020.

Figure 3:
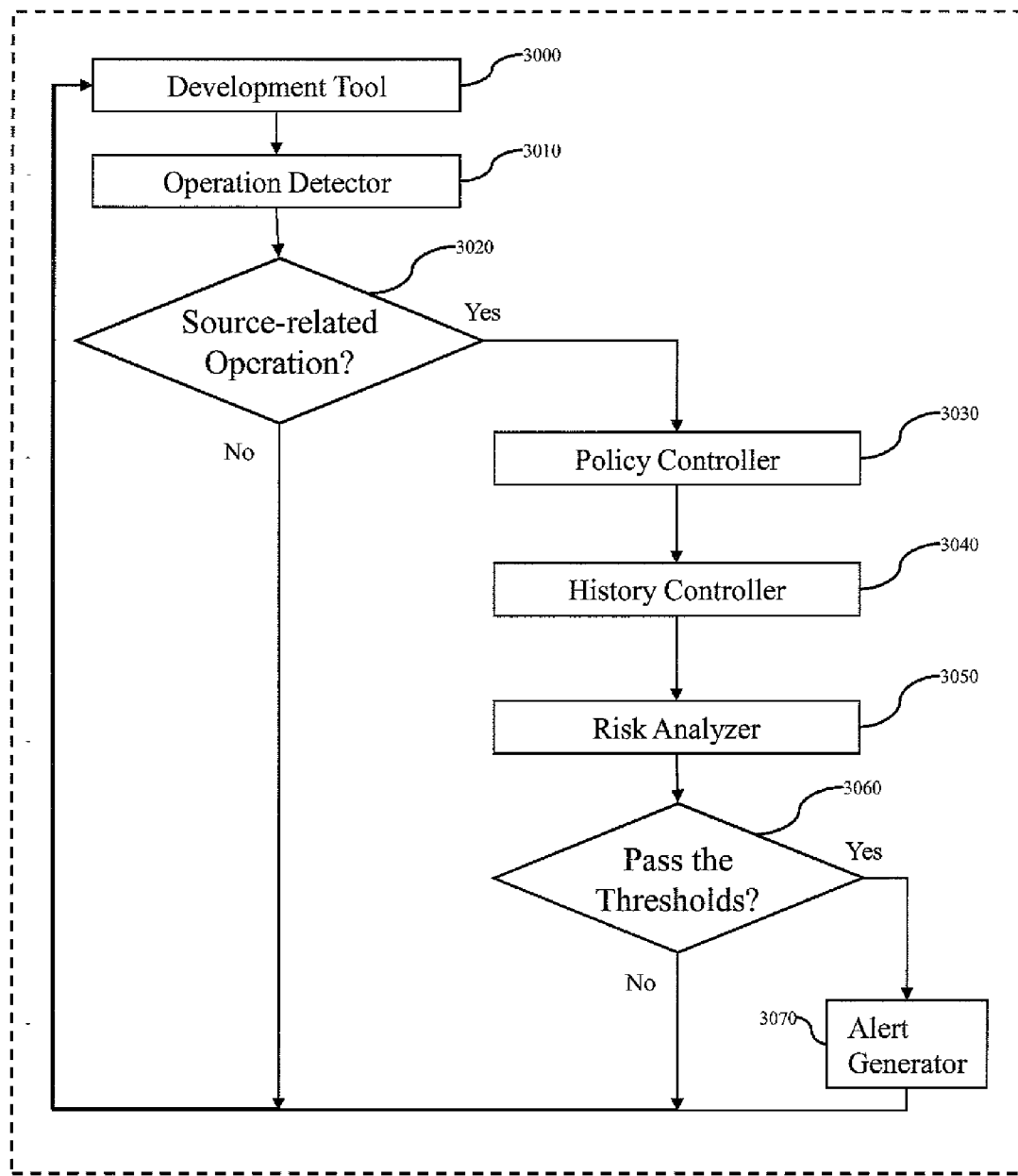
FIG. 3 illustrates a flow chart describing method steps that one embodiment of the present invention employs.

FIG. 3 illustrates a flow chart describing method steps that the logic 2050 employs. A user 1020 (e.g., a developer, programmer, designer, creator, etc.) works (e.g., creating a sub-object, modifying a sub-object, etc.) by using the development tool 2060 at step 3000. The operation detector 2070 detects the user's operation (e.g., adding a sub-object in an object, deleting a sub-object in an object, modifying a sub-object in an object, etc.) at step 3010, and then checks whether the user's operation is a source-related operation (i.e., an operation deleting/adding/modifying source information of an object) at step 3020. If the user's operation is not a source-related operation, then no additional step is invoked and control continues at step 3000. If the operation detector 2070 identifies the user's operation as a source-related operation, e.g., by detecting a "delete" key keystroke to delete author information of code, the policy controller 2080 is invoked at step 3030, which fetches policies (e.g., some software package (e.g., competitor's libraries) cannot be used in this project; e.g., open source code having GPL (General Public License) or LGPL (Lesser General Public License) cannot be used in this project) for the user's operation from the server database 2120. (The policies are also described in detail later with FIG. 6.) Then, the history controller 2090 is invoked at step 3040 to record the user's operation in the server database 2120 and also retrieve previous operations associated with the policies from the server database 2120. At step 3050, the risk analyzer 2100 is invoked to calculate a result (i.e., whether the user's operation causes a source-related risk; e.g., a Boolean value indicating whether the user's operation requires a special license or not; e.g., a quantitative value indicating a frequency of the user's operation). To generate the result, at step 3060, the risk analyzer 2100 may determine whether the user's operation exceeds a threshold (e.g., this commercial project should not include more than 1% contribution from a specific programmer who is actively involved in an open source project) specified in the policies. (The threshold is also described in detail later with FIG. 6.) If the result indicates that the user's operation does not exceed any threshold specified in the policies, no additional step is invoked and thereafter control continues at step 3000. Otherwise, at step 3070, the alert generator 2110 is invoked to generate an alert for the user's operation. After the step 3070, control continues at step 3000.

In one embodiment, when a user logins a development tool 2060 to work on an object, the policy controller 2080 obtains, e.g., from a project manager or from the server database 2120, criteria of a source-related risk associated with an object that a user is working on. The policy controller 2080 may further obtain, e.g., from a project manager or the server database 2120, thresholds associated with the source-related risk that the user is causing and associated with object that the user is working on. While a user performs an operation on the object, e.g., by using the development tool 2060, the operation detector 2070 may detect the operation on the object, e.g., based on keystrokes of the user. Every operation detected by the operation detector 2070 is sent to a risk analyzer 2100. Then, the risk analyzer 2100 determines whether an operation satisfies the criteria of the source-related risk or whether the operation exceeds a threshold associated with the source-related risk and the operation. If risk analyzer 2100 determines the operation satisfies a criterion of the source-related risk or the operation exceeds a threshold associated with the source-related risk and the operation, then the alert generator 2110 generates an alert for the operation. The history controller 2090 may generate a report of criteria of source-related risk that the operation satisfies. The history controller 2090 may further generate a report of threshold(s) that the operation causes to exceed.

The criteria of the source-related risk may include, but is not limited to:

Adding or pasting a sub-object in the object: that sub-object has unknown source information and is not compliant with a policy associated with the object. For example, if the policy associated with the object states that open source code having GPL or LGPL cannot be used in the object and a user adds a sub-object that comes from open source repository having GPL or LGPL, the addition of the sub-object may be a source-related risk.

Modifying a sub-object: that sub-object may have source information which is not permitted in the object. For example, if a user modifies a sub-object whose creator is well-known for inserting hidden virus or error on code, then the creator may not be accepted in the object and the modification on the sub-object may be a source-related risk.

Deleting source information of a sub-object in the object: For example, if a user deletes a copyright term in the sub-object, the deletion of the copyright term may be a source-related risk.

The thresholds associated with the source-related risk and associated with object may include, but are not limited to:

A threshold of percentage of added or pasted sub-object whose source information is not known: For example, a policy associated with an object may state that the object cannot include more than 1% open source code whose source information is unknown.

A threshold of incompliant source information of the object: For example, a policy associated with an object may state that the object should not include more than 1% contribution (e.g., source code writing) from a programmer who is well-known for hiding virus or errors on his/her code.

A threshold of similarity between a current operation and previous operations: For example, a policy associated with an object may state that a current operation on the object and previous operations on the object should not include no more than 30% similarity. Basit et al, "Detecting higher-level similarity patterns in programs" (hereinafter "Basit"), ESEC-FSE'05, September 2005, describes detecting similarity in programs. Therefore, whole content of Basit is incorporated as a reference. Asako Ohno, "Measure source code similarity using reference vectors" (hereinafter "Ohno"), International Journal of Innovative Computing, Information and Control vol. 3, num. 3, June 2007, describes measuring similarity between source code. Therefore, whole content of Ohno is incorporated as a reference.

A threshold of a removal of source information of the object: For example, a policy associated with an object may state that more than 1% of source information associated with the object should not be deleted.

In a further embodiment, the history controller 2090 maintains a history of operations that generated an alert. For example, the history controller 2090 stores current and previous operations that generated an alert in the server database 2120. The history controller 2090 maintains a history of criteria of the source-related risk that the operations satisfied (i.e., all the criteria the operations satisfied until now). The history controller 2090 maintains a history of a threshold that the operations caused to exceed (i.e., all the thresholds that the operations caused to exceed until now). For example, the history controller 2090 generates and stores the following table in a server database 2120:

TABLE 1

| Information managed by the history controller 2090 | | | |
|---|---|---|---|
| A user's name, email address, employee identification number | Operation | Threshold that was exceed by the operation | A criterion that the operation satisfied |
| Peter, Peter@IBM.com, 1203456789 | Adding an sub-object whose source information is not known | The adding the sub-object caused that the object included more than 1% unknown source information | Adding a sub-object whose source information is unknown |

The history controller 2090 may provides such a table to a user or a project manager upon a request. As shown, the table 1 includes, but is not limited to include, operations, criteria of the source-related risk that the operation satisfied and thresholds the operations caused to exceed.

In one embodiment, the history controller 2090 stores previous operations on an object. The risk analyzer 2100 compares a current operation on the object and previous operations on the object and then calculates a similarity between the current operation and previous operations. (Ohno, whose content is incorporated as a reference, describes a way to measure a similarity between program source code that performs a current operation and other program source code that performed previous operations.) The alert generator 2110 generates an intrusive and/or silent alert (e.g., on-and-off light, vibration), if the calculated similarity is larger than the threshold of similarity (previously described threshold of similarity) and if source information of the object associated with the calculated similarity is removed.

Figure 4:
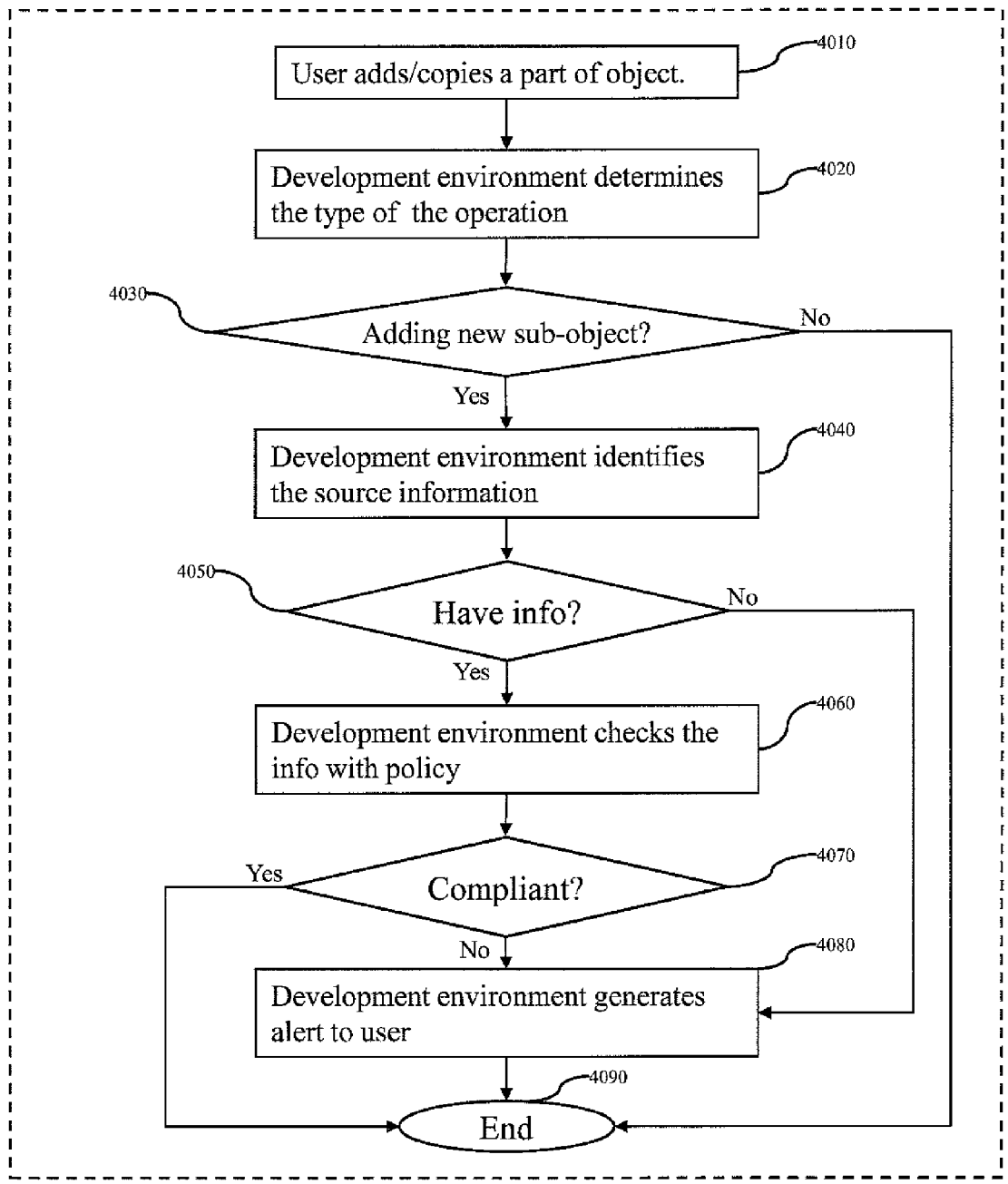
FIG. 4 illustrates detecting a risk and alerting a user when adding a sub-object according to one embodiment of the present invention.

In one embodiment, an operation on an object is adding a sub-object in an object or deleting a sub-object in an object. FIG. 4 illustrates detecting a source-related risk and alerting a user when adding a sub-object in an object. In one embodiment, steps in FIG. 4 are implemented as hardware on FPGA, CPLD or ASIC by using hardware description language. In another embodiment, steps in FIG. 4 are implemented as software by using programming languages (e.g., C++, Java, C, .Net, etc.). In an alternative embodiment, steps in FIG. 4 are implemented as hardware by storing the steps in a computer readable medium (e.g., a compact disc, a digital versatile disc, a hard disk, an optical disk, a solid state drive, a memory 2040, etc.) as compute program instructions (e.g., binary code or machine code) being executed by a processor 2010.

At step 4010, a user 1020 adds or pastes a part of an object in his/her development environment 1000. The operation detector 2070 in the development environment 1000 detects and determines a type of the user's operation (e.g., adding/pasting a sub-object or deleting a sub-object) in step 4020. Specifically, at step 4030, it is evaluated whether the operation is adding or pasting a new sub-object in the object. If the operation is not adding or pasting a sub-object, control ends at step 4090. If the operation is adding or pasting a sub-object in the object, the development environment 1000 determines whether the sub-object includes source information at step 4040, e.g., by identifying the source information in the sub-object (e.g., identifying a developer information in a comment associated with the sub-object; identifying a developer information in a copyright term associated with the sub-object). If there is no source information in the sub-object, at step 4080, the alert generator 2110 generates an alert to the user. If there is source information associated with the sub-object, at step 4060-4070, the policy controller 2080 retrieves a policy (e.g., the object can include at most 1% contribution from a programmer who is actively participating an open source project) associated with the object from the server database 2120. Then, it is evaluated whether the source information is compliant with the policy associated with the object. If the source information is not compliant with the policy, at step 4080, the alert generator 2110 in development environment 1000 generates an alert to the user 1020 and then finishes generating the alert at step 4090. If the source information of the sub-object is compliant with the policy, the development environment 1000 is discharged at step 4090.

Figure 5:
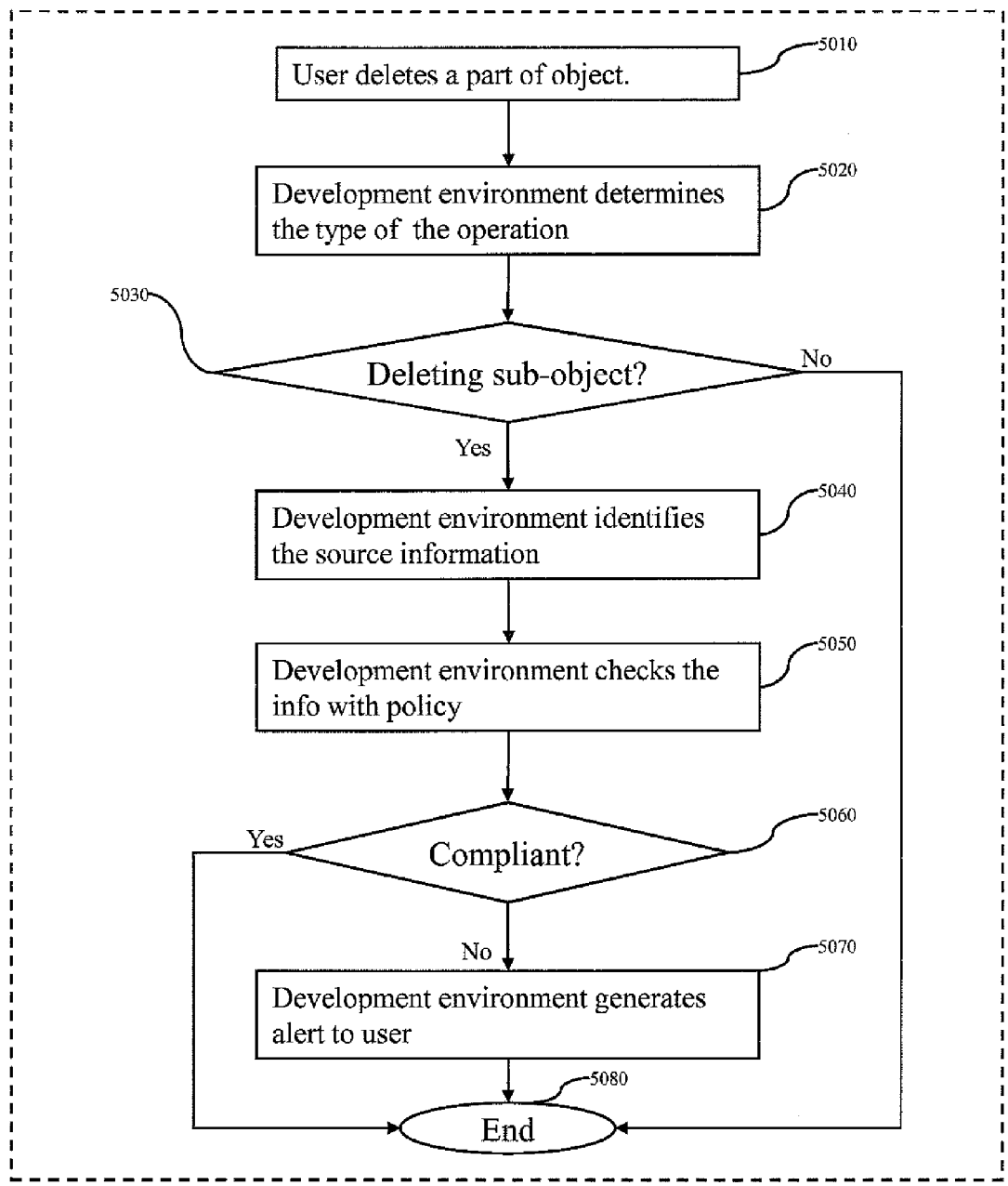
FIG. 5 illustrates detecting a risk and alerting a user when deleting a sub-object according to one embodiment of the present invention.

FIG. 5 illustrates detecting a risk and alerting a user when performing an object modification, e.g., when deleting a sub-object in an object. In one embodiment, steps in FIG. 5 are implemented as hardware on FPGA, CPLD or ASIC by using hardware description language. In another embodiment, steps in FIG. 5 are implemented as software by using programming languages (e.g., C++, Java, C, .Net, etc.). In an alternative embodiment, steps in FIG. 5 are implemented as hardware by storing the steps in a computer readable medium (e.g., a compact disc, a digital versatile disc, a hard disk, an optical disk, a solid state drive, a memory 2040, etc.) as compute program instructions (e.g., binary code or machine code) being executed by a processor 2010.

At step 5010, a user 1020 deletes a part of object in his/her development environment 1000. At step 5020, the operation detector 2070 in the development environment 1000 detects and determines a type of the user's operation (e.g., adding a sub-object in the object or deleting a sub-object in the object). Specifically, at step 5030, it is evaluated whether the operation is deleting a sub-object in the object. If the operation is not deleting a sub-object in the object, control ends at step 5080. Otherwise, the development environment 1000 identifies source information associated with the sub-object at step 5040, e.g., in a comment associated with sub-object or in a copyright term associated with sub-object. The policy controller 2080 in the development environment 1000 then retrieves a policy (e.g., a copyright term of open source code should be maintained in the server database 2120 although that open source code is deleted) related to the source information at step 5050. The risk analyzer 2100 in the development environment 1000 evaluates whether the source information is compliant with the policy at step 5060. If the source information is not compliant with the policy, the alert generator 2110 in the development environment 1000 generates an alert to the user 1020 at step 5070. Then, at step 5080, the development environment 1000 is discharged. If the source information of the sub-object is found to be compliant with the policy, the development environment 1000 is discharged at step 5080.

Figure 6:
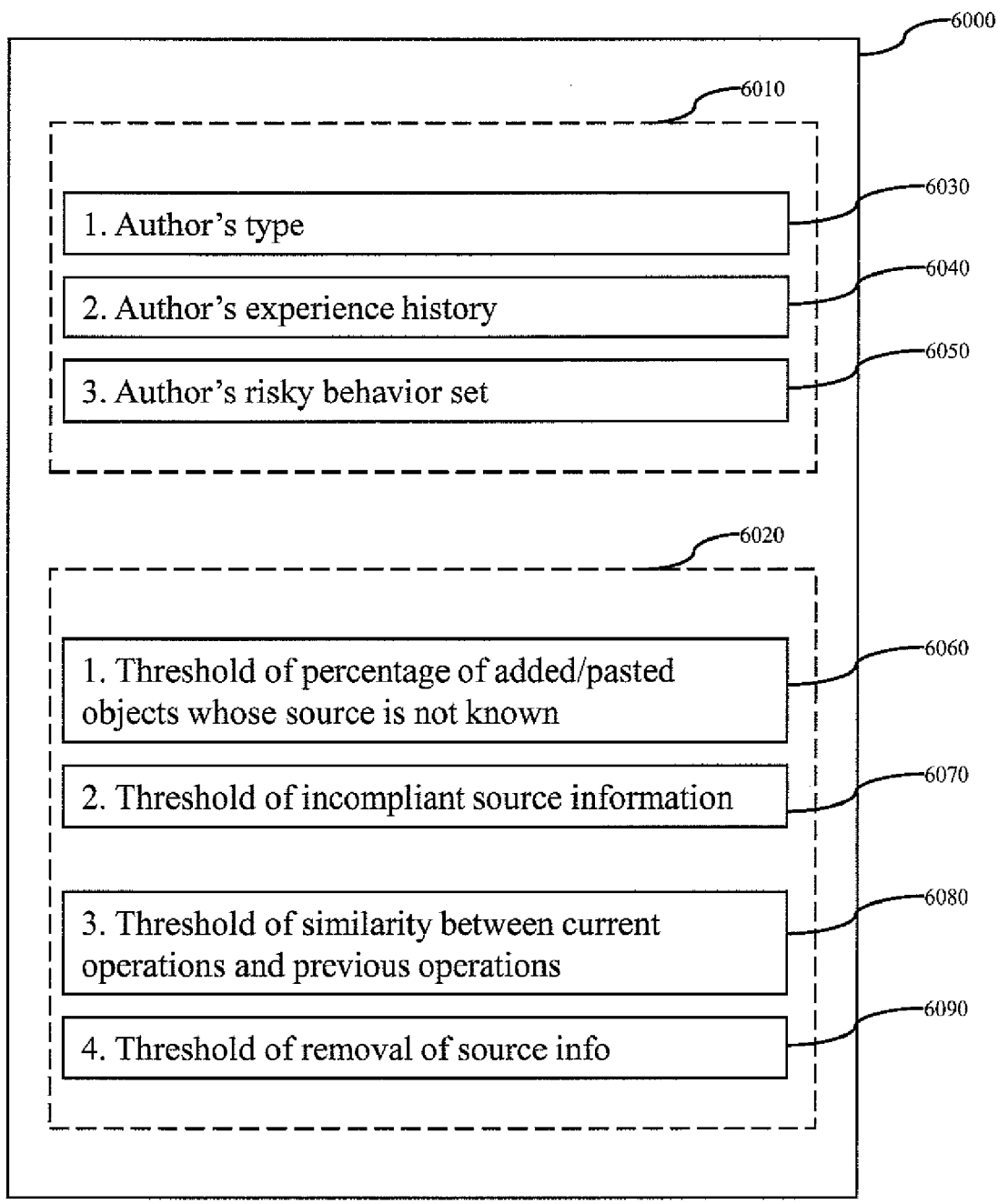
FIG. 6 illustrates field of a policy for evaluating source-related risk according to one embodiment of the present invention.

FIG. 6 illustrates an exemplary policy 6000 associated with an object in one embodiment of the present invention. Though the policy 6000 has two fields and each field also has three subfields or four subfields, the policy 6000 can include a number of fields and a plurality of subfields. As illustrated in FIG. 6, the policy 6000 may include two fields: one is an author/user reputation profile 6010; the other is a set of the thresholds of source-related risks 6020. The thresholds may be represented by numbers, Boolean values and/or percentages. The author/user reputation profile 6010 may comprise a type of an author/user 6030, e.g. full-time employee, part-time employee, vendor, intern, etc. The author/user reputation profile 6010 may further include an experience history of an author/user 6040, e.g., whether the author/user worked on an open source project. The author/user reputation profile 6010 may also include a credibility of an author/user 6050, e.g., whether the author/user introduced risky operations (e.g., deleting source information of a sub-object) or risky behaviors (e.g., adding a sub-object with unknown source information) before. The author/user reputation profile 6010 may be extended to include source information of operations that the author/user has performed and to include previous operations that the author/user performed.

The set of the thresholds of the source-related risks 6020 may include, but is not limited to include, previously described thresholds such as: the threshold of percentage of added or pasted objects whose source is not known 6060, the threshold of incompliant source information 6070, the threshold of similarity between current operation(s) and previous operation(s) 6080, the threshold of removal of source information 6090, etc. All these thresholds can be customized and configured according to a project's nature (e.g., how much a project can include source-related risk; e.g., whether a project is to develop a freeware or a commercial product).

In one embodiment, whether a current operation of a user causes to exceed a threshold is determined based on the user's user reputation profile 6010 and the current operation. For example, a users' user reputation profile 6010 indicates that the user was previously involved in an open source project and that the user is adding a sub-object from the open source project into an object. However, if a policy associated with the object states that the object should not include any sub-object from an open source repository and a threshold of incompliant source information of the object is zero percentage, then adding the sub-object causes to exceed the threshold of incompliant source information.

Figure 7:
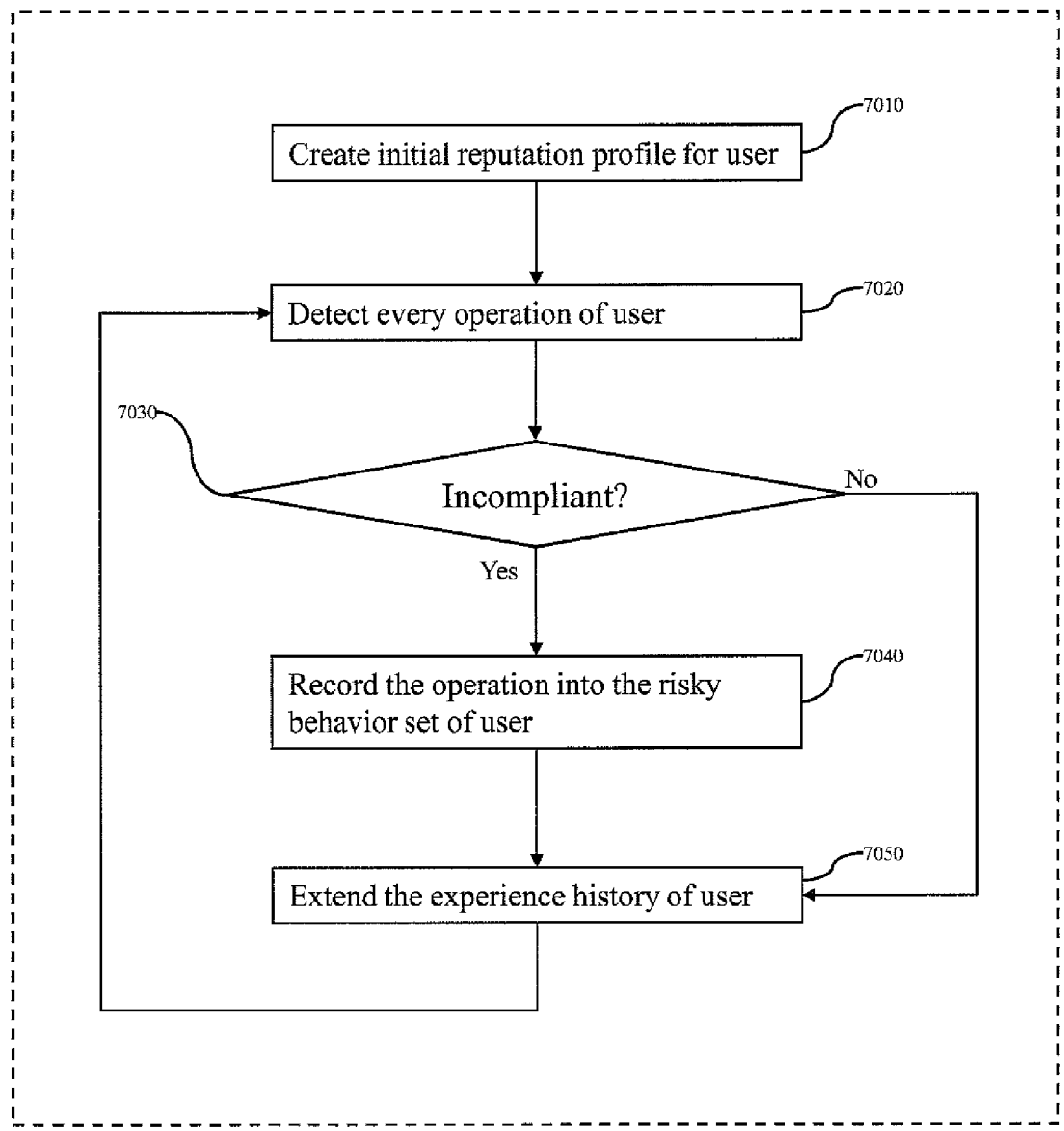
FIG. 7 illustrates method steps for building and updating a user reputation profile according to one embodiment of the present invention.

FIG. 7 illustrates method steps for building and updating a user reputation profile 6010. In one embodiment, steps in FIG. 7 are implemented as hardware on FPGA, CPLD or ASIC by using hardware description language. In another embodiment, steps in FIG. 7 are implemented as software by using programming languages (e.g., C++, Java, C, .Net, etc.). In an alternative embodiment, steps in FIG. 7 are implemented as hardware by storing the steps in a computer readable medium (e.g., a compact disc, a digital versatile disc, a hard disk, an optical disk, a solid state drive, a memory 2040, etc.) as compute program instructions (e.g., binary code or machine code) being executed by a processor 2010.

At step 7010, the development environment 1000 creates an initial reputation profile (not shown) for a new author/developer. The initial reputation profile may include a type of the author/developer (e.g., a full-time employee, part-time employee, etc.), an experience history of the author/developer (e.g., whether the author/developer worked on an open source project) and a credibility of the author/developer (e.g., whether the author/developer added a sub-object with unknown source information before). After the initial profile is created, at step 7020, the operation detector 2070 in the development environment 1000 detects every operation on every object performed by the author/developer. Then, the development environment 1000 invokes the policy controller 2080 to retrieve policies associated with the object and associated with operation.

At step 7030, the risk analyzer 2100 determines whether the operation is incompliant with the policies. For example, the risk analyzer 2100 evaluates whether the operation satisfies a criterion among previously described criteria of the source-related risk (e.g., deleting source information of a sub-object in the object; e.g., adding a sub-object whose source information is not known). The risk analyzer 2100 further evaluates whether the operation causes to exceed a threshold among the previously described thresholds (e.g., a threshold of incompliant source information; e.g., a threshold of percentage of added sub-object whose source information is not known). If the operation is incompliant with the policies (e.g., the operation satisfies a criterion or the operation causes to exceed a threshold), at step 7040, the development environment 1000 updates the credibility of the author/developer in the initial user reputation profile with the operation that is incompliant with the policies. After updating the credibility of the author/developer or if the operation is compliant with the policies, the development environment 1000 extends the experience history of the author/developer with the operation at step 7050. After the step 7050, the development environment 1000 continuously detects the author/developer's operation to build the user reputation profile by returning to the step 7020.

In one embodiment, the risk analyzer 2100 determines an author/developer of an operation, e.g., by communicating with the operation detector 2070 or by parsing and analyzing a comment associated with the operation. Then, the risk analyzer 2100 retrieves a user reputation profile 6010 of the author/developer from the sever database 2120 in the development environment 1000. The risk analyzer 2100 determines a level of source-related risk of the operation based on the retrieved user reputation profile 6010. For example, there are three levels of source-related risk of an operation: high-level source-related risk (i.e., a source-related risk that is very urgent and requires the operation to be canceled), middle-level source-related risk (i.e., a source-related risk that is recommended to cancel the operation) and low-level source-related risk (i.e., source-related risk that requires an attention from the author/developer). If the credibility of the author/developer in the user reputation profile 6010 indicates an author/developer always add a sub-object with unknown source information from an open source repository, adding a sub-object by the author/developer may be rated as a high-level source-related risk. If the credibility of the author/developer in the user reputation profile 6010 indicates an author/developer used to delete source information of a sub-object after adding the sub-object, adding a sub-object by the author/developer may be rated as a middle-level source-related risk. If the credibility of the author/developer in the user reputation profile 6010 indicates an author/developer worked for an open source project before, adding a sub-object from his previous project by the author/developer may be rated as a low-level source-related risk.

Although the embodiments of the present invention have been described in detail, it should be understood that various changes and substitutions can be made therein without departing from spirit and scope of the inventions as defined by the appended claims. Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

The present invention may be implemented on a computer readable medium (e.g., a compact disc, a digital versatile disc, a hard disk, an optical disk, a solid state drive, etc.) embodying computer program instructions (e.g., C++, C, Java, .Net, Assembly languages, binary code, etc.) being executed by a processor (e.g., IBM® PowerPC®, SUN® Sparc®, etc.) for causing a computer (e.g., a desktop, a laptop, a server, etc.) to perform one or more functions of this invention. The present invention further includes a method of deploying a computer program product including a program of instructions in a computer readable medium for one or more function of this invention, wherein, when the program of instructions is executed by a processor, the computer program product performs the one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art

What is claimed is:

1. A method for detecting a source-related risk associated with an object and generating an alert concerning the source-related risk comprising:

obtaining at least one criterion of the source-related risk associated with the object;

obtaining at least one threshold associated with the source-related risk and associated with the object;

detecting an operation on the object;

determining whether the operation satisfies the at least one criterion of the source-related risk;

determining, based on a user reputation profile and the operation, whether the operation causes exceeding the at least one threshold, the user reputation profile comprising one or more of: a type of an author; an experience history of the author; a credibility of the author; a source information of the operation; and previous operations of the author, the user reputation profile generated by:

creating an initial reputation profile with the type of the author, the experience history of the author and the credibility of the author;

detecting every operation of the author in every object;

determining whether an operation satisfies the at least one criterion of the source-related risk;

determining whether an operation causes exceeding the at least one threshold;

updating the credibility of the author with an operation, if the operation satisfies the at least one criterion of the source-related risk or if the operation causes exceeding the at least one threshold; and extending the experience history of the author with the operation and the object; and generating the alert if the operation satisfies the at least one criterion of the source related-risk, or if the operation causes exceeding the at least one threshold, wherein a computing system including at least one processor and at least one memory device connected to the processor performs the operation detecting, operation satisfaction determining, exceeding threshold determining, and the alert generating.

2. The method according to claim 1, further comprising:
generating a report of the at least one criterion of the source-related risk that the operation satisfies; and
generating a report of the at least one threshold that the operation causes to exceed.

3. The method according to claim 1, further comprising:
maintaining a history of operations that generated the alert;
maintaining a history of the at least one criterion of the source-related risk that the operations satisfied;
maintaining a history of the at least one threshold that the operations caused to exceed; and
generating a report of the operations, the at least one criterion of the source-related risk that the operations satisfied and the at least one threshold that the operations caused to exceed.

4. The method according to claim 1, further comprising:
determining an author of the operation;
retrieving the user reputation profile of the author; and
determining a level of the source-related risk of the operation based on the user reputation profile of the author.

5. The method according to claim 1, wherein the at least one criterion of the source-related risk is one or more of:
adding or pasting a sub-object in the object, the sub-object having unknown source information and not being compliant with a policy associated with the object;
modifying a sub-object in the object, the sub-object having source information which is not permitted in the object; and
deleting source information of a sub-object in the object.

6. The method according to claim 1, wherein the at least one threshold comprises:
a threshold of percentage of added or pasted sub-objects whose source information is not known;
a threshold of incompliant source information of the object;
a threshold of similarity between the operation and previous operations; and
a threshold of a removal of source information of the object.

7. The method according to claim 6, further comprising:
maintaining the previous operations;
comparing the operation and previous operations and then calculating a similarity between the operation and previous operations; and
generating the alert, if the calculated similarity is larger than the threshold of the similarity and the source information of the object associated with the calculated similarity is removed.

8. The method according to claim 1, wherein the operation is adding a sub-object in the object or deleting a sub-object in the object.

9. The method according to claim 8, further comprising:
determining whether the operation is adding the sub-object in the object;
determining whether the sub-object includes source information, if the operation is adding the sub-object in the object;
generating the alert, if there is no source information;
determining whether the source information is compliant with a policy associated with the object, if there is the source information; and
generating the alert, if the source information is not compliant with the policy.

10. The method according to claim 8, further comprising:
determining whether the operation is deleting the sub-object in the object;
identifying source information of the sub-object;
determining whether the source information is compliant with a policy associated with the object; and
generating the alert, if the source information is not compliant with the policy.

11. A system for detecting a source-related risk associated with an object and generating an alert concerning the source-related risk, said system comprising:
a memory storage device;
a processor unit in communication with the memory device that performs a method comprising:
obtaining at least one criterion of the source-related risk associated with the object;
obtaining at least one threshold associated with the source-related risk and associated with the object;
detecting an operation on the object;
determining whether the operation satisfies the at least one criterion of the source-related risk;
determining, based on a user reputation profile and the operation, whether the operation causes exceeding the at least one threshold, the user reputation profile comprising one or more of: a type of an author; an experience history of the author; a credibility of the author; a source information of the operation; and previous operations of the author, the user reputation profile generated by:
creating an initial reputation profile with the type of the author, the experience history of the author and the credibility of the author;
detecting every operation of the author in every object;
determining whether an operation satisfies the at least one criterion of the source-related risk:
determining whether an operation causes exceeding the at least one threshold;
updating the credibility of the author with an operation, if the operation satisfies the at least one criterion of the source-related risk or if the operation causes exceeding the at least one threshold; and extending the experience history of the author with the operation and the object; and generating the alert if the operation satisfies the at least one criterion of the source related-risk, or if the operation causes exceeding the at least one threshold.

12. The system according to claim 11, wherein said method further comprises:

generating a report of the at least one criterion of the source-related risk that the operation satisfies; and generating a report of the at least one threshold that the operation causes to exceed.

13. The system according to claim 11, wherein said method further comprises:

maintaining a history of operations that generated the alert;

maintaining a history of the at least one criterion of the source-related risk that the operations satisfied;

maintaining a history of the at least one threshold that the operations caused to exceed; and generating a report of the operations, the at least one criterion of the source-related risk that the operations satisfied and the at least one threshold that the operations caused to exceed.

14. The system according to claim 11, wherein said method further comprises:

determining an author of the operation;

retrieving the user reputation profile of the author; and determining a level of the source-related risk of the operation based on the user reputation profile of the author.

15. The system according to claim 11, wherein the at least one criterion of the source-related risk is one or more of:

adding or pasting a sub-object in the object, the sub-object having unknown source information and not being compliant with a policy associated with the object;

modifying a sub-object in the object, the sub-object having source information which is not permitted in the object; and deleting source information of a sub-object in the object.

16. The system according to claim 11, wherein the at least one threshold comprises:

a threshold of percentage of added or pasted sub-objects whose source information is not known;

a threshold of incompliant source information of the object;

a threshold of similarity between the operation and previous operations; and a threshold of a removal of source information of the object.

17. The system according to claim 16, wherein said method further comprises:

maintaining the previous operations;

comparing the operation and previous operations and then calculating a similarity between the operation and previous operations; and generating the alert, if the calculated similarity is larger than the threshold of the similarity and the source information of the object associated with the calculated similarity is removed.

18. The system according to claim 11, wherein the operation is adding a sub-object in the object or deleting a sub-object in the object.

19. The system according to claim 18, wherein said method further comprises:

determining whether the operation is adding the sub-object in the object;

determining whether the sub-object includes source information, if the operation is adding the sub-object in the object;

generating the alert, if there is no source information;

determining whether the source information is compliant with a policy associated with the object, if there is the source information; and generating the alert, if the source information is not compliant with the policy.

20. The system according to claim 18, wherein said method further comprises:

determining whether the operation is deleting the sub-object in the object;

identifying source information of the sub-object;

determining whether the source information is compliant with a policy associated with the object; and generating the alert, if the source information is not compliant with the policy.

21. A computer readable medium tangibly embodying computer program instructions being executed by a processor device for causing a computer to detect a source-related risk associated with an object and to generate an alert concerning the source-related risk according to a method as claimed in claim 1.

* * * * *